(12) United States Patent
Östling et al.

(10) Patent No.: US 6,375,383 B1
(45) Date of Patent: Apr. 23, 2002

(54) ATTACHMENT DEVICE

(75) Inventors: Sture Östling; Uno Axelsson, both of Katrineholm (SE)

(73) Assignee: SKF Mekan AB, Katrineholm (SE)

( * ) Notice: Subject to any disclaimer, the term of this patent is extended or adjusted under 35 U.S.C. 154(b) by 0 days.

(21) Appl. No.: 09/568,809

(22) Filed: May 11, 2000

(30) Foreign Application Priority Data

May 11, 1999 (SE) .......................... 9901711-3

(51) Int. Cl.[7] ................................ F16B 2/14
(52) U.S. Cl. ................. 403/374.3; 403/374.1; 403/370
(58) Field of Search ............... 403/373, 374.1–374.4, 403/367–369, 314, 356, 380, 370

(56) References Cited

U.S. PATENT DOCUMENTS

| | | | |
|---|---|---|---|
| 3,565,471 A | | 2/1971 | Nilsson ................. 403/369 |
| 3,590,652 A | * | 7/1971 | Strang ................. 74/421 |
| 3,861,815 A | * | 1/1975 | Landaeus ............. 403/370 |
| 4,268,185 A | * | 5/1981 | Mullenberg .......... 403/16 |
| 4,362,411 A | * | 12/1982 | Asberg ................ 403/5 |
| 4,407,603 A | * | 10/1983 | Lundgren ............ 403/370 |
| 4,598,443 A | * | 7/1986 | Ostling et al. ....... 24/136 R |
| 4,630,960 A | * | 12/1986 | Reeves, Jr. .......... 403/345 |
| 4,643,609 A | * | 2/1987 | Biass .................. 403/369 |
| 5,613,795 A | * | 3/1997 | Anthony et al. ..... 403/370 |
| 5,658,192 A | * | 8/1997 | Reinauer ............. 451/342 |
| 5,961,247 A | * | 10/1999 | Gold et al. .......... 403/369 |

* cited by examiner

Primary Examiner—Lynne H. Browne
Assistant Examiner—John B. Walsh
(74) Attorney, Agent, or Firm—Burns, Doane, Swecker & Mathis, L.L.P.

(57) ABSTRACT

An attachment device for arresting a machine member having a substantially cylindrical bore on a cylindrical shaft includes first and second sleeve members adapted to be positioned in a space between the outer surface of the shaft and the inner surface of the bore in the machine member. The two sleeve members have mating, cooperating taper surfaces in the form of a plurality of saw-tooth-shaped axially tapering sections that face one another. At least one of the sleeve members is movable for displacement relative to the other sleeve member to change the radial size of at least one of the sleeve members. The end edge of the first sleeve member projects axially beyond an adjacent end edge of the second sleeve member for receiving an external pushing force causing the first element to be displaced relative to the second element to cause the relative displacement of the sleeve members. The opposite end edge of the second sleeve members engages a stop that may be formed on the machine member.

16 Claims, 2 Drawing Sheets

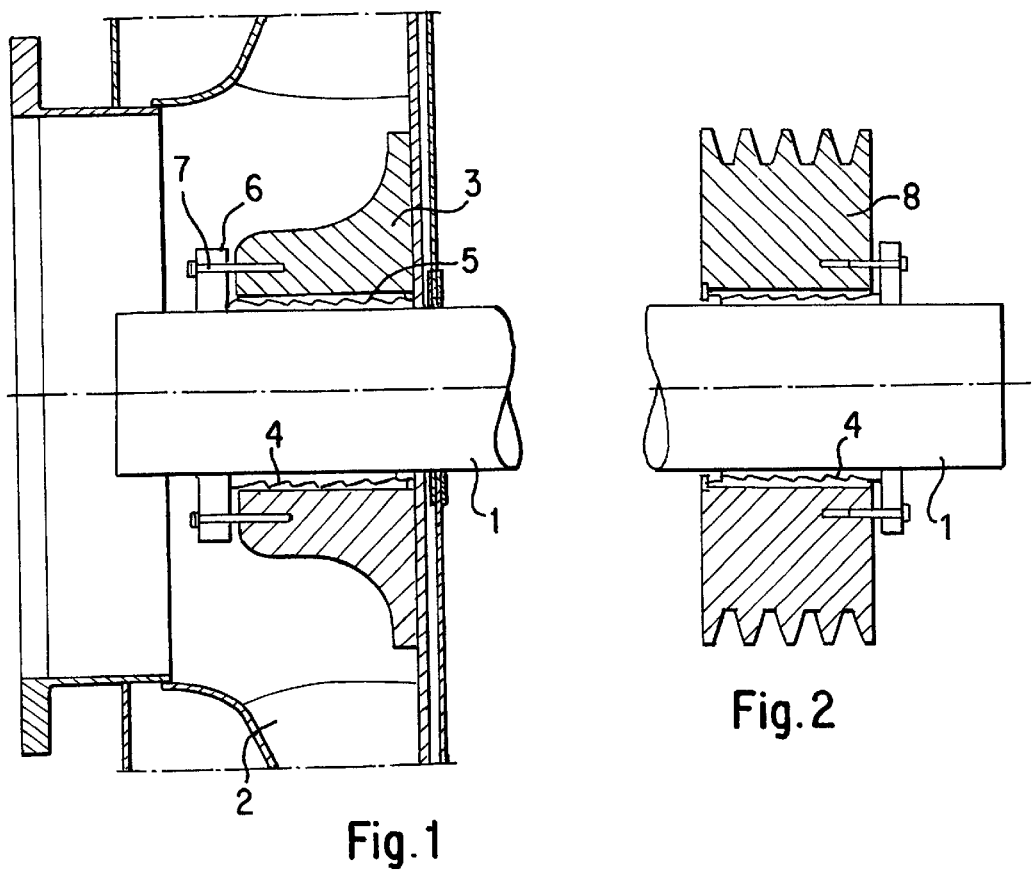
Fig. 1
Fig. 2
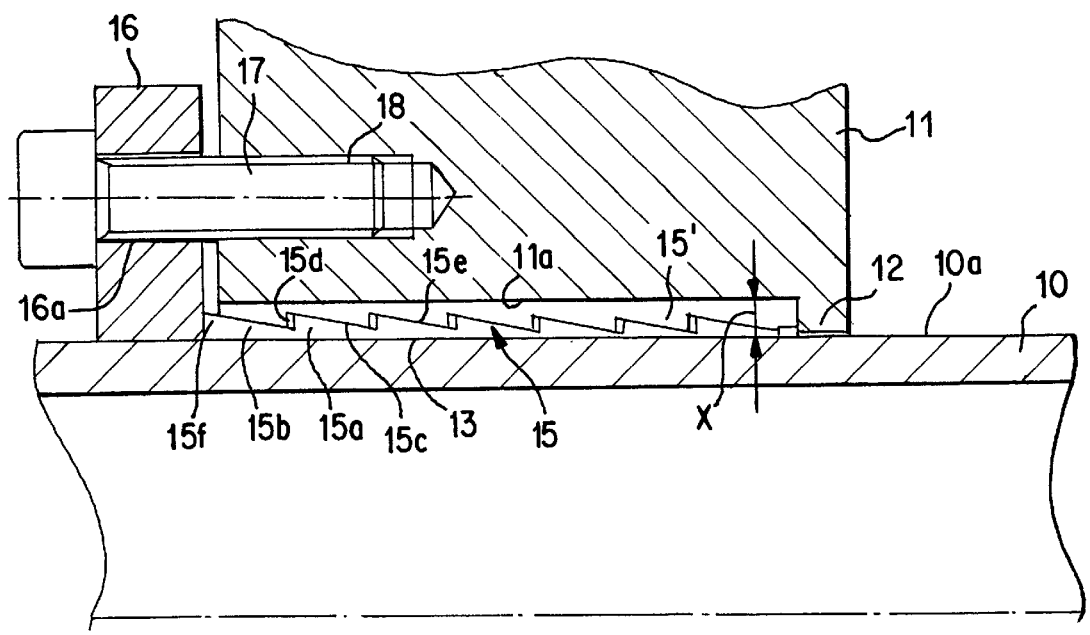
Fig. 3

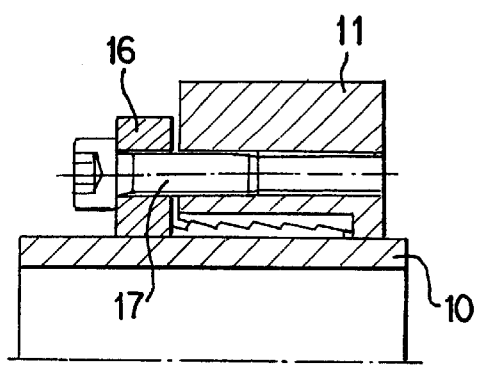
Fig. 4
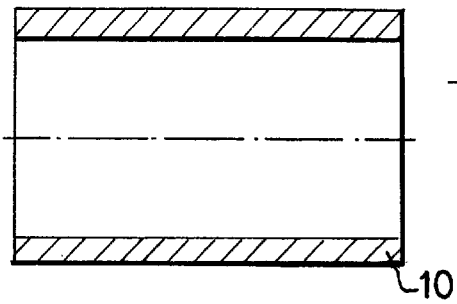
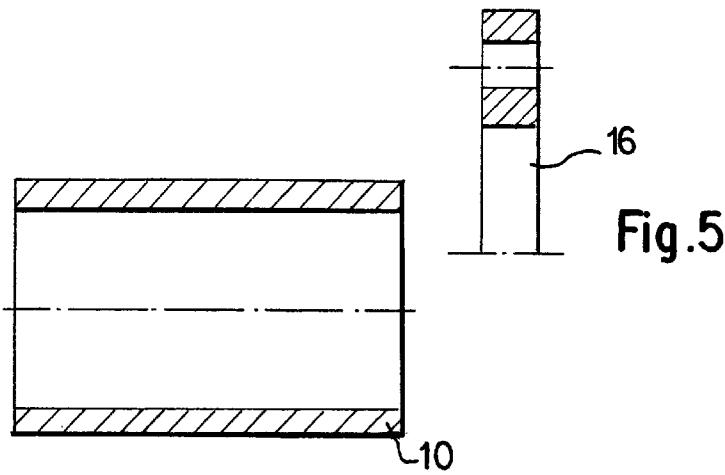
Fig. 6
Fig. 5
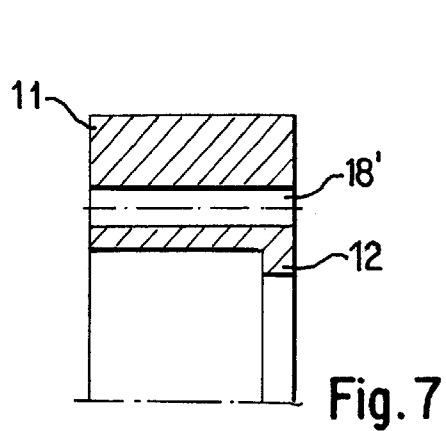
Fig. 7
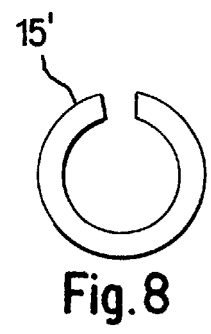
Fig. 8

ATTACHMENT DEVICE

This application is based on and claims priority under 35 U.S.C. §119 with respect to Swedish Patent Application No. 9901711-3 filed on May 11, 2000, the entire content of which is incorporated herein by reference.

FIELD OF THE INVENTION

The present invention generally relates to securing a member on a shaft. More particularly, the present invention pertains to an attachment device for arresting a member having a substantially cylindrical bore on a cylindrical shaft.

BACKGROUND OF THE INVENTION

The mounting of different bore-provided machine members, such as fan wheels, belt pulleys and the like, on a cylindrical shaft so that the machine member will not move circumferentially and/or axially relative to the shaft can be effected in a variety of different ways. It is known, for example, to use a keyway in the shaft and/or in the boss or hub of the machine member, and a key inserted in such keyway for preventing relative circumferential movement between the shaft and the machine member. However, this requires machining the keyway in the shaft. In addition to increasing the manufacturing cost, this process has a tendency to reduces the strength of the shaft. Also, this process is not well suited to being used together with light and inexpensive hollow shafts.

Similar limitations exist with respect to the use of thread joints as this requires thread cutting of the shaft and the inner surface of the bore in the machine member.

The mounting described above can also be achieved using a tapering adapter sleeve. However, this requires that either the shaft or the bore of the machine member have a corresponding taper, thus increasing the manufacturing costs.

Cylindrical shaft and hub joints can also be obtained through the use of a press fit effected with or without the use of a pressure oil arrangement. This alternative is difficult to use with hollow shafts due to large radially inwardly directed forces.

A clamping device addressing at least some of the aforementioned has been employed. This device, named Ringfeder®, manufactured by Ringfeder GmbH, Krefeld, Germany, consists of pairs of ring members having a short axial extension and mating tapering surfaces. A first closed ring member of the pair has a cylindrical bore intended to be arranged in contact with the envelope or outer surface of the shaft and a tapering surface on its opposite side. The second closed ring member of the pair has a cylindrical outer envelope surface intended to contact the cylindrical bore of the member to be attached to the shaft. This second ring member has a bore taper substantially corresponding to that of the outer surface of the first ring member. When the first ring member of the pair has been fitted on the shaft and the second ring member has been loosely fitted thereabout, and also loosely inside the bore of the machine member to be fitted, it is possible to achieve a good grip between the two ring members and, via the intermediary of those ring members, also between the shaft and the machine member. This grip is achieved by pushing the second ring member axially along the external envelope surface of the first ring member, thereby gradually increasing the radial width of the two ring members. For further increasing the retaining force between the shaft and machine member, the pair of Ringfeder® rings can then be multiplied for achieving the desired grip. The first ring members of the consecutive pairs of ring members are thus positioned with their adjacent gable faces engaging each other and also the second ring member in the adjacent pair. The axial force required for mutually displacing the ring members is obtained by way of a flange ring which is moved axially towards the machine member by being acted upon by screws tightened in threaded bores in the machine member.

Due to the fact that the pairs of ring members are not interconnected, the risk of misalignment exists because the ring members are not centered. This means that the establishment of the grip between the shaft and the machine member might vary from one occasion to another, a result that is undesirable. The plurality of separate elements, i.e. a number of pairs of separate ring members, also makes stocking and handling of these attachment mechanisms extensive and cumbersome.

A need thus exists for an attachment mechanism that is not as susceptible to the same disadvantages and drawbacks as discussed above.

It would be desirable to provide an attachment mechanism that, in a relatively simple and efficient manner permits interconnection of a cylindrical shaft and a machine member having a cylindrical bore, without the need for machining the components to close tolerances and without experiencing drawbacks and disadvantages associated with earlier solutions such as discussed above.

SUMMARY OF THE INVENTION

According to one aspect of the invention, a machine member having a substantially cylindrical bore is mounted on a substantially cylindrical shaft, and a stop is provided on the machine member. The bore in the machine member has an inner diameter that is larger than the outer diameter of the shaft so that an annular space exists between the machine member and the shaft. A pair of elements is positioned in the space and have mating, cooperating taper surfaces facing each other. At least one of the elements is movable for displacement relative to the other element to change a radial size of at least one of the elements and thereby increase or reduce a clamping force between the machine member and the shaft. The pair of elements includes a first thin-walled sleeve member enclosing a portion of the shaft and having an outer surface and a smooth inner surface, and a second thin-walled sleeve member engaging the bore of the machine member and having an inner surface and a smooth outer surface. The second sleeve member encloses the first sleeve member. The outer surface of the first sleeve member and the inner surface of the second sleeve member have a plurality of saw-tooth-shaped axially tapering sections. The second sleeve member has one end edge abutting against the stop, and an end edge of the first sleeve member projects outside the opposite end edge of the second sleeve member for receiving an external pushing force causing the at least one element to be displaced relative to the other element to cause the displacement.

According to another aspect of the invention, an arrangement includes a machine member having a substantially cylindrical bore mounted on a substantially cylindrical shaft, and a first sleeve member and a second sleeve member positioned in a space located between an inner surface of the bore in the machine member and an outer surface of the shaft. The first sleeve member has a surface provided with saw-tooth-shaped axially tapering sections and the second sleeve member has a surface provided with saw-tooth-shaped axially tapering sections. The saw-tooth-shaped axially tapering sections of the first sleeve member engage the saw-tooth-shaped axially tapering sections of the second sleeve member. One end edge of the second sleeve member extends axially beyond the one end edge of the first sleeve member and engages a stop. At least the first sleeve member is axially movable relative to the second sleeve member to cause the saw-tooth-shaped axially tapering sections of the first sleeve member to move along the saw-tooth-shaped axially tapering sections of the second sleeve member to increase or decrease a clamping force between the machine member and the shaft. In addition, the second end edge of the first sleeve member extends axially beyond the second end edge of the second sleeve member for receiving an external pushing force causing the first sleeve member to be displaced relative to the second sleeve member.

According to a further embodiment of the invention, an attachment device for arresting a machine member having a substantially cylindrical bore on a cylindrical shaft includes a pair of elements adapted to be positioned in a space between an outer surface of the shaft and an inner surface of the bore in the machine member. The elements have mating cooperating taper surfaces facing each other, with at least one of said elements being movable for displacement relative to the other element to change the radial size of at least one of the elements. The pair of elements includes a first thin-walled sleeve member adapted to encircle a portion of the shaft and having an outer surface and a smooth inner surface. The pair of elements also includes a second thin-walled sleeve member adapted to engage the bore in the machine member and having an inner surface and a smooth outer surface. The second sleeve member encloses the first sleeve member. The outer surface of the first sleeve member and the inner surface of the second sleeve member possess a plurality of saw-tooth-shaped axially tapering sections. An end edge of the first sleeve member projects axially beyond an adjacent end edge of the second sleeve member for receiving an external pushing force causing the first element to be displaced relative to the second element to cause said displacement.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein:

FIG. 1 is a cross-sectional view of a fan wheel attached to a shaft by the attachment device according to the present invention;

FIG. 2 is a cross-sectional view of a belt pulley attached to a shaft by the attachment device according to the present invention;

FIG. 3 is an enlarged cross-sectional view illustrating a portion of the attachment device shown in FIGS. 1 and 2;

FIG. 4 is a schematic cross-sectional view of the attachment device similar to that shown in FIG. 3;

FIGS. 5–7 are cross-sectional views of components incorporated in the attachment device illustrated in FIGS. 1–4; and FIG. 8 is an end view of one of the sleeves forming a part of the attachment device.

DETAILED DESCRIPTION OF THE INVENTION

Referring initially to FIG. 1, a portion of a shaft 1 is rotatably supported in bearings (not shown) and supports a machine member in the form of a fan wheel 2. The fan wheel 2 is fixed to the shaft 1 adjacent the free end of the shaft 1. The fan wheel 2 has a hub 3 which is connected to the shaft 1 by way of an attachment device or mechanism 4 in accordance with the present invention.

This attachment device 4, which will be described in more detail in connection with the illustration in FIG. 3, includes a two-piece sleeve 5 and a ring 6 attached to the hub 3 of the fan wheel 2 via bolts 7. The joint or attachment device is strong enough to prevent the fan wheel 2 from moving circumferentially as well as axially relative to the shaft 1, without the need for any other a components preventing such motions.

FIG. 2 illustrates in a similar manner a machine member in the form of a belt pulley 8 that is fitted to a shaft 1 by way of an attachment device or mechanism 4 similar to that illustrated in FIG. 1. The attachment mechanism shown in FIG. 2 possesses the same components as the attachment device illustrated in FIG. 1.

FIG. 3 shows on an enlarged scale a portion of a hollow shaft 10 to which is secured a machine member 11 which is only partially shown. The illustration in FIG. 3 shows the features of the attachment device as applied to a generally illustrated machine member, it being understood that the machine member can be in the form of the fan wheel depicted in FIG. 1 and the belt pulley shown in FIG. 2. Thus, the features of the attachment device shown in FIG. 3 and described below are the same as those associated with attachment devices shown in FIGS. 1 and 2.

Referring to FIG. 3, the hollow shaft 10 has a cylindrical external envelope surface 10a. The machine member 11 possesses an inner bore 11a having a cylindrical shape and a diameter greater than the outer diameter of the shaft. A shoulder 12 forming a stop is provided at one axial side of the bore in the machine member 11. This shoulder 12 possesses a diameter that is slightly larger than the outer diameter of the shaft, thereby providing a clearance allowing the machine member 11 to be relatively easily pushed up the shaft 10 to a desired arresting position.

The annular space 13 formed between the inner surface 11a of the bore in the machine member 11 and the outer surface 10a of the shaft 10 has a certain radial dimension x. In this space 13 is located a two-piece sleeve 15 forming a primary part of the attachment device according to the present invention. This two-piece sleeve 15 is comprised of a first or inner sleeve member 15a having a cylindrical inner surface and an external surface provided with a successively or continuously arranged axial series of tapering, substantially saw-tooth-shaped surface elements sections. The surface elements include a first element or section 15b tapering from a larger diameter to a smaller diameter, followed by a consecutively or successively arranged second surface element or section 15c connected to the first section 15b via a substantially radial wall member 15d. Thus, the end of the section 15c adjacent the narrower end of the section 15b has substantially the same outer diameter as that of the section 15b at its largest diameter end, i.e., at the end remote from the second section 15c. That is, the end of the section 15c located closest to the narrower end of the section 15b has substantially the same outer diameter as the end of the section 15b that is remote from the section 15c.

The section 15c is related and connected to the next section 15e in the same manner as the first section 15b is related and connected to the second section 15c. Each successive section is also related and connected to the adjacent section in a similar manner.

The second or outer piece 15' of the two-piece sleeve is designed as a reverse image of the first inner sleeve piece 15a. The second or outer sleeve member 15' thus has a cylindrical outer envelope surface and an inner surface provided with saw-tooth-shaped surface elements that are complementary to those of the inner sleeve member 15a. The outer sleeve member 15' is coaxially positioned with respect to the inner sleeve member 15a and is arranged to enclose or encircle the first sleeve member 15a, with a short section 15f of the inner sleeve member 15a projecting axially out from the interior of the outer sleeve member 15' at one end.

The attachment device also incorporates a ring member 16 arranged around the shaft 10 on the side of the machine member 11 facing away from its shoulder 12. That is, the ring member 16 is positioned on the side of the machine member 11 that is remote from the shoulder 12 of the machine member 11. This ring member 16 is provided with a number of axially extending through-holes 16a, only one of which is shown in FIG. 3, but several of which are illustrated in FIGS. 1 and 2. Each of the axially extending through-holes 16a receives a respective bolt 17 that projects through the respective through-hole 16a and is screwed into a corresponding threaded bore 18 in the machine member 11.

The ring member 16 abuts against the projecting sleeve portion 15f of the inner sleeve 15a. By tightening the bolt(s) 17, the inner sleeve 15a moves axially relative to the outer sleeve 15' to cause the cooperating tapering surfaces of the inner and the outer sleeves 15a, 15' to slide against each other, thereby first reaching the radial measure x of the space 13. With continued tightening of the bolt(s) 17, the grip between the attachment device and the shaft 10 is increased as is the grip between the attachment device and the interior of the machine member 11, until a firm grip is obtained in the circumferential direction as well as in the axial direction. This firm grip or securement is achieved without the need for using keyslots, threads or the like.

The consecutively or successively arranged saw-tooth-shaped taper portions are made in an integral unit and so the attachment device is centered in its seat without substantial risk of misalignment, In addition, the handling and stock-keeping of the attachment device is simplified as compared to the Ringfeder® system mentioned above, because the large number of taper members used in the Ringfeder® system are reduced to only two sleeve-shaped members which can be delivered and handled as a single, held-together two-piece unit.

The two sleeve members 15a, 15' are preferably manufactured by treating a steel belt in a rolling mill so that one side face of the belt is provided with the saw-tooth-shaped pattern extending in the longitudinal direction of the belt. Two lengths of appropriate dimensions are then severed or cut from the steel belt possessing the saw-tooth-shaped pattern one side face. These two lengths are positioned with the saw-tooth profiles facing and abutting against each other in the manner illustrated in FIG. 3, and with the two lengths displaced relative to each other to such an extent that an end portion of one projects beyond the other to thereby form the projecting sleeve portion 15f. Finally the two lengths of steel belt positioned in such a manner relative to each other are subjected to a rolling operation forming them into a substantially cylindrical form having cylindrical outer and inner surfaces.

At least one, but preferably both, of the sleeve members 15a, 15' thus shaped can be provided with a transverse slot that extends axially, such as shown in FIG. 8, to contribute to the radial expansion when the two sleeve members are pushed together. Due to this manufacturing operation, the two sleeve members are held together as a unit, which cannot be dismounted without deforming the unit.

FIG. 4 illustrates in cross-section a device substantially corresponding to the device shown in FIG. 3, and including a hollow shaft 10, a machine member 11 and an attachment device according to the present invention. The main difference between the embodiment shown in FIG. 4 as compared to the embodiment of FIG. 3 relates to the threaded bore 18' in the machine member 11 that receives the bolt 17. In the embodiment shown in FIG. 4, the threaded bore is a through-hole extending completely through the machine member so that it possesses two open ends whereas in the embodiment shown in FIG. 3, the threaded bore 18' is a blind bore having one closed end.

The simplicity of the components forming part of the attachment device or joint of the present invention is illustrated in FIGS. 5–7, showing the ring member 16, the hollow shaft 10 and the machine member 11. It is to be seen that none of these components requires complicated manufacturing operations and the requirements for close tolerances are modest.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. An arrangement comprising a machine member having a substantially cylindrical bore mounted on a substantially cylindrical shaft, and a stop provided on the machine member, the bore having an inner diameter that is larger than an outer diameter of the shaft so that an annular space exists between the machine member and the shaft, a pair of elements positioned in the space and having mating, cooperating taper surfaces facing each other, at least one of said elements being movable for displacement relative to the other element to change a radial size of at least one of the elements and thereby increase or reduce a clamping force between the machine member and the shaft, the pair of elements including a first thin-walled sleeve member enclosing a portion of the shaft and having an outer surface and a smooth inner surface, and a second thin-walled sleeve member engaging the bore of the machine member and having an inner surface and a smooth outer surface, the second sleeve member enclosing the first sleeve member, the outer surface of the first sleeve member and the inner surface of the second sleeve member having a plurality of saw-tooth-shaped axially tapering sections, the first sleeve member having first and second end edges and the second sleeve having first and second end edges, the second end edge of the first sleeve member projecting outside the second end edge of the second sleeve member for receiving an external pushing force causing the at least one element to be displaced relative to the other element in a direction to cause said displacement while the first end edge of the second sleeve member which is located at one axial end of the second sleeve member abuts against the stop to prevent displacement of the second sleeve member in said direction.

2. The arrangement according to claim 1, wherein at least one of the first and the second sleeve members is provided with a substantially axially extending slot.

3. The arrangement according to claim 2, wherein the first and second sleeve members form a held-together unit.

4. The arrangement according to claim 1, wherein the first and second sleeve members form a held-together unit.

5. The arrangement according to claim 1, wherein the first and second sleeve members are formed from longitudinal belt-shaped elements, provided with the saw-tooth-shaped tapering sections via a forming operation, and wherein a rolling operation is formed to a sleeve unit comprising the two sleeve members as a held-together unit.

6. The arrangement according to claim 1, including a ring member provided on the shaft in abutting engagement with the second end edge of the first sleeve member projecting outside the second end edge of the second sleeve member, said ring member being movable towards the machine member to effect said displacement.

7. The arrangement according to claim 6, wherein the ring member is movable by way of at least one bolt extending through a bore in the ring member and into a threaded bore in the machine member.

8. An arrangement comprising a machine member having a substantially cylindrical bore mounted on a substantially cylindrical shaft, a first sleeve member and a second sleeve member positioned in a space located between an inner surface of the bore in the machine member and an outer surface of the shaft, the first sleeve member having first and second end edges, the second sleeve member having first and second end edges, the first sleeve member having a surface provided with saw-tooth-shaped axially tapering sections and the second sleeve member having a surface provided with saw-tooth-shaped axially tapering sections, the saw-tooth-shaped axially tapering sections of the first sleeve member engaging the saw-tooth-shaped axially tapering sections of the second sleeve member, the first end edge of the second sleeve member extending axially beyond the first end edge of the first sleeve member and engaging a stop, at least said first sleeve member being axially movable relative to the second sleeve member to cause the saw-tooth-shaped axially tapering sections of the first sleeve member to move along the saw-tooth-shaped axially tapering sections of the second sleeve member to increase or decrease a clamping force between the machine member and the shaft, the second end edge of the first sleeve member extending axially beyond the second end edge of the second sleeve member for receiving an external pushing force causing the first sleeve member to be displaced relative to the second sleeve member.

9. The arrangement according to claim 8, wherein at least one of the first and second sleeve members is slotted.

10. The arrangement according to claim 8, wherein the first and second sleeve members form a held-together unit.

11. The arrangement according to claim 8, wherein the second sleeve member surrounds the first sleeve member.

12. The arrangement according to claim 8, including a ring member provided on the shaft in abutting engagement with the second end edge of the first sleeve member that projects axially beyond the second end edge of the second sleeve member.

13. The arrangement according to claim 12, including a bolt extending through a bore in the ring member and into a threaded bore in the machine member to move the ring member towards the machine member.

14. An attachment device for arresting a machine member having a substantially cylindrical bore on a cylindrical shaft, the attachment device comprising a pair of elements positioned in a space between an outer surface of the shaft and an inner surface of the bore in the machine member, the elements having mating, cooperating taper surfaces facing each other, at least one of said elements being movable for displacement relative to the other element to change a radial size of at least one of the elements, the pair of elements including a first thin-walled sleeve member adapted to encircle a portion of the shaft, the first sleeve member having an outer surface and a smooth inner surface, and a second thin-walled sleeve member adapted to engage the bore in the machine member, the second sleeve member having an inner surface and a smooth outer surface, the second sleeve member enclosing the first sleeve member, the outer surface of the first sleeve member and the inner surface of the second sleeve member having a plurality of saw-tooth-shaped axially tapering sections, a first end edge of the first sleeve member projecting axially beyond an adjacent first end edge of the second sleeve member for receiving an external pushing force causing the first element to be displaced relative to the second element to cause said displacement, said external pushing force being applied by a bolt positioned in a bore in a ring member and threadably engaging a threaded bore in the machine member, and a stop on the machine member engaging a second end edge of the second sleeve member.

15. The attachment device according to claim 14, wherein at least one of the first and the second sleeve members is provided with a substantially axially extending slot.

16. The attachment device according to claim 14, wherein the first and second sleeve members form a held-together unit.

\* \* \* \* \*